US010495912B2

(12) United States Patent
Hwang

(10) Patent No.: US 10,495,912 B2
(45) Date of Patent: Dec. 3, 2019

(54) METHOD OF MANUFACTURING LIQUID CRYSTAL DISPLAY PANEL AND LIQUID CRYSTAL DISPLAY PANEL MANUFACTURED BY THE SAME

(71) Applicant: Samsung Display Co., Ltd., Yongin-si (KR)

(72) Inventor: Seong Mo Hwang, Seongnam-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 15/494,997

(22) Filed: Apr. 24, 2017

(65) Prior Publication Data

US 2017/0307923 A1   Oct. 26, 2017

(30) Foreign Application Priority Data

Apr. 26, 2016  (KR) .................. 10-2016-0050587

(51) Int. Cl.
  *G02F 1/1333* (2006.01)
  *G06F 3/041* (2006.01)
  *G02F 1/1343* (2006.01)
  *G02F 1/1362* (2006.01)

(52) U.S. Cl.
  CPC ........ *G02F 1/13338* (2013.01); *G06F 3/0412* (2013.01); *G02F 2001/133331* (2013.01); *G02F 2001/134372* (2013.01); *G02F 2001/136222* (2013.01); *G02F 2202/28* (2013.01); *G06F 2203/04103* (2013.01); *G06F 2203/04112* (2013.01)

(58) Field of Classification Search
  CPC .................................................. G02F 1/13338
  See application file for complete search history.

(56) References Cited

U.S. PATENT DOCUMENTS

| 9,007,329 B2 | 4/2015 | Lee et al. |
| 9,401,479 B2 | 7/2016 | Lee et al. |
| 2010/0066650 A1* | 3/2010 | Lee ..................... G02F 1/13338 345/64 |
| 2011/0261296 A1* | 10/2011 | Park .................. G02F 1/133502 349/96 |

(Continued)

FOREIGN PATENT DOCUMENTS

| JP | 2012-133598 | * 7/2012 | ............ G06F 3/041 |
| KR | 10-2010-0031242 | 3/2010 | |

(Continued)

*Primary Examiner* — Sang V Nguyen
(74) *Attorney, Agent, or Firm* — H.C. Park & Associates, PLC

(57) ABSTRACT

A method of manufacturing a liquid crystal display panel including forming an upper polarizing layer on an upper base film substrate, cutting the upper base film substrate on which the upper polarizing layer is formed, attaching a cover glass on the upper polarizing layer, forming a touch pattern on the upper base film substrate, forming an insulation layer on the upper base film substrate on which the touch pattern is formed, forming an upper alignment layer on the insulation layer, providing a lower substrate including a thin film transistor, a first electrode electrically connected to the thin film transistor, a second electrode overlapping the first electrode, a color filter overlapping the first electrode, and a lower alignment layer, and forming a liquid crystal layer between the lower substrate and an upper substrate.

11 Claims, 15 Drawing Sheets

(56) References Cited

U.S. PATENT DOCUMENTS

| | | | | |
|---|---|---|---|---|
| 2012/0063168 A1* | 3/2012 | Nambu | G02B 6/0031 | 362/609 |
| 2013/0234974 A1* | 9/2013 | Guard | G06F 3/044 | 345/174 |
| 2013/0335376 A1 | 12/2013 | Lee | | |
| 2014/0132553 A1* | 5/2014 | Park | G06F 3/044 | 345/174 |
| 2014/0153100 A1* | 6/2014 | Yi | G02B 5/223 | 359/609 |
| 2014/0231001 A1* | 8/2014 | Tsai | B32B 37/1284 | 156/247 |
| 2015/0076458 A1* | 3/2015 | Lee | H01L 51/56 | 257/40 |
| 2015/0140349 A1* | 5/2015 | Lee | C08J 3/075 | 428/478.2 |
| 2015/0160401 A1* | 6/2015 | Namekata | G02F 1/1336 | 349/65 |
| 2015/0255722 A1* | 9/2015 | Lee | H01L 51/0024 | 438/25 |
| 2015/0309377 A1* | 10/2015 | Choi | G02F 1/133514 | 349/43 |
| 2015/0378206 A1* | 12/2015 | Sung | G02F 1/133305 | 349/43 |
| 2016/0085100 A1* | 3/2016 | Toyoshima | H01L 27/323 | 349/12 |
| 2016/0116788 A1* | 4/2016 | Samurada | G02F 1/133308 | 349/58 |
| 2017/0293067 A1* | 10/2017 | Watanabe | G02B 6/0033 | |
| 2017/0329183 A1* | 11/2017 | Tsuchida | G02F 1/133606 | |
| 2017/0355173 A1* | 12/2017 | Tanaka | B32B 27/00 | |

FOREIGN PATENT DOCUMENTS

| | | |
|---|---|---|
| KR | 10-1165456 | 7/2012 |
| KR | 10-2014-0062269 | 5/2014 |
| KR | 10-2015-0105532 | 9/2015 |

* cited by examiner

METHOD OF MANUFACTURING LIQUID CRYSTAL DISPLAY PANEL AND LIQUID CRYSTAL DISPLAY PANEL MANUFACTURED BY THE SAME

CROSS-REFERENCE TO RELATED APPLICATION

This application claims priority from and the benefit of Korean Patent Application No. 10-2016-0050587, filed on Apr. 26, 2016, which is hereby incorporated by reference for all purposes as if fully set forth herein.

BACKGROUND

Field

Exemplary embodiments relate to a method of manufacturing a liquid crystal display panel and a liquid crystal display panel manufactured by the method. More particularly, exemplary embodiments relate to a method of manufacturing a liquid crystal display panel with an embedded touch sensor capable of touch recognition, and a liquid crystal display panel is manufactured by the method.

Discussion of the Background

Recently, a display apparatus having light weight and small size has been manufactured. Previously, a cathode ray tube (CRT) display apparatus had been typically used for performance and price reasons. However, the CRT display apparatus has disadvantages in having a relatively large size and a lack of portability. Therefore, a display apparatus, such as a plasma display apparatus, a liquid crystal display apparatus, and an organic light emitting display apparatus has been highly regarded due to small size, light weight, and low power consumption.

The liquid crystal display apparatus applies a voltage to specific molecular arrangement configured to change the molecular arrangement. The liquid crystal display apparatus displays an image using changes of at least one optical property (for example, birefringence, rotatory polarization, dichroism and light scattering) of a liquid crystal cell according to the changes of the molecular arrangement.

Recently, an ultra thin liquid crystal display apparatus having a touch input function has been developed. However, when a touch panel is attached to a traditional liquid crystal display panel to form the liquid crystal display apparatus, there is a problem in that the manufacturing process is inefficient, and the thickness of the liquid crystal display apparatus is excessively large. Accordingly, a technology for manufacturing a touch pattern for a touch input function directly on a liquid crystal display panel has been developed. However, it has been proven difficult to apply the technology to the ultra thin liquid crystal display apparatus due to process problems.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a simplified method of manufacturing an ultra-thin liquid crystal display apparatus.

Exemplary embodiments also provide a liquid crystal display panel manufactured by the simplified method.

Additional aspects will be set forth in the detailed description which follows, and, in part, will be apparent from the disclosure, or may be learned by practice of the inventive concepts.

An exemplary embodiment of the inventive concepts discloses a method of manufacturing a liquid crystal display panel including forming an upper polarizing layer on an upper base film substrate, cutting the upper base film substrate on which the upper polarizing layer is formed, attaching a cover glass on the upper polarizing layer, forming a touch pattern on the upper base film substrate, forming an insulation layer on the upper base film substrate on which the touch pattern is formed, forming an upper alignment layer on the insulation layer, providing a lower substrate comprising a thin film transistor, a first electrode electrically connected to the thin film transistor, a second electrode overlapping the first electrode, a color filter overlapping the first electrode, and a lower alignment layer, and forming a liquid crystal layer between the lower substrate and an upper substrate which comprises the cover glass, the upper base film substrate, the upper polarizing layer, the touch pattern and the insulation layer.

In an exemplary embodiment, thickness of the upper base film substrate may be equal to or less than 0.2 mm (millimeters).

In an exemplary embodiment, an area of the cover glass may be greater than that of the upper base film substrate. A light blocking part may be formed at an edge of the cover glass.

In an exemplary embodiment, a thickness of the cover glass may be equal to or greater than 0.3 mm.

In an exemplary embodiment, the lower substrate may further include a lower base substrate on which the thin film transistor, the first electrode, the second electrode, the color filter, and the lower alignment layer are formed. A thickness of the lower base substrate may be equal to or greater than 0.4 mm.

In an exemplary embodiment, a thickness of the lower base substrate may be less than or equal to 0.2 mm.

In an exemplary embodiment, providing the lower substrate may include attaching a lower carrier glass on the lower base substrate and forming the thin film transistor, the first electrode, the second electrode, the color filter, and the lower alignment layer on the lower base substrate on the lower carrier glass.

In an exemplary embodiment, forming the liquid crystal layer may include forming the liquid crystal layer between the upper substrate and the lower substrate on the lower carrier glass, and separating the lower carrier glass from the lower base substrate.

In an exemplary embodiment, a thickness of the lower carrier glass may be greater than or equal to 0.4 mm.

In an exemplary embodiment, forming the touch pattern may be performed below 100 degrees Celsius.

An exemplary embodiment of the inventive concepts also discloses a method of manufacturing a liquid crystal display panel including attaching an upper carrier glass on an upper base film substrate, forming a touch pattern on the upper base film substrate, forming an upper polarizing layer on the touch pattern, attaching a cover glass on the upper polarizing layer, separating the upper carrier glass from the upper base film substrate, forming an upper alignment layer on the upper base film substrate, providing a lower substrate comprising a thin film transistor, a first electrode electrically connected to the thin film transistor, a second electrode overlapping the first electrode, a color filter overlapping the first electrode, and a lower alignment layer, and forming a liquid crystal layer between the lower substrate and an upper substrate which comprises the cover glass, the upper base film substrate, the upper polarizing layer, the touch pattern and the insulation layer.

In an exemplary embodiment, a thickness of the upper base film substrate may be less than or equal to 0.2 mm.

In an exemplary embodiment, an area of the cover glass may be greater than that of the upper base film substrate. A light blocking part may be formed at an edge of the cover glass.

In an exemplary embodiment, a thickness of the lower base substrate may be less than or equal to 0.2 mm. Providing the lower substrate may include attaching a lower carrier glass on the lower base substrate, and forming the thin film transistor, the first electrode, the second electrode, the color filter and the lower alignment layer on lower base substrate on the lower carrier glass.

In an exemplary embodiment, forming the liquid crystal layer may include forming the liquid crystal layer between the upper substrate and the lower substrate on the lower carrier glass, and separating the lower carrier glass from the lower base substrate.

An exemplary embodiment of the inventive concepts also discloses a liquid crystal display panel including an upper substrate, a lower substrate, and a liquid crystal layer disposed between the upper substrate and the lower substrate. The upper substrate includes a cover glass, an adhesive layer disposed on the cover glass, an upper polarizing layer disposed on the adhesive layer, an upper base film substrate disposed on the upper polarizing layer and having a thickness less than or equal to 0.2 mm, a touch pattern formed on the upper base film substrate, an insulation layer disposed on the touch pattern, and an upper alignment layer disposed on the insulation layer. The lower substrate includes a lower base substrate facing the upper base film substrate, a thin film transistor formed on the lower base substrate, a first electrode electrically connected to the thin film transistor, a color filter overlapping the first electrode, a second electrode overlapping the first electrode, and a lower alignment layer disposed between the liquid crystal layer and the lower base substrate.

In an exemplary embodiment, a thickness of the upper base film substrate may be less than or equal to 0.2 mm.

In an exemplary embodiment, an area of the cover glass may be greater than that of the upper base film substrate. A light blocking part may be formed at an edge of the cover glass.

In an exemplary embodiment, a thickness of the cover glass may be greater than or equal to 0.3 mm.

In an exemplary embodiment, a thickness of the lower base substrate may be less than or equal to 0.2 mm.

According to the inventive concepts, a touch pattern is formed after a cover glass is having sufficient thickness and durability is attached on an upper base film substrate, so that the upper base film substrate can be firmly fixed and supported without the additional carrier glass during the deposition and patterning process. Thus, according to an exemplary embodiment, there is no need to adhere and detach the additional carrier glass, so that manufacturing process of the liquid crystal display apparatus may be simplified.

In addition, a color filter, a black matrix and a column spacer are formed at a lower substrate, so that an upper substrate only has a structure for touch sensing, and a polarizer. Thus, a manufacturing process of the upper substrate of the liquid crystal display apparatus may be simplified.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 2A, FIG. 2B, FIG. 2C, FIG. 2D, FIG. 2E, FIG. 2F, FIG. 2G, FIG. 2H, and FIG. 2I are cross-sectional views illustrating a method of manufacturing a liquid crystal display panel according to an exemplary embodiment of the inventive concepts.

DETAILED DESCRIPTION OF THE ILLUSTRATED EMBODIMENTS

Figure 1:
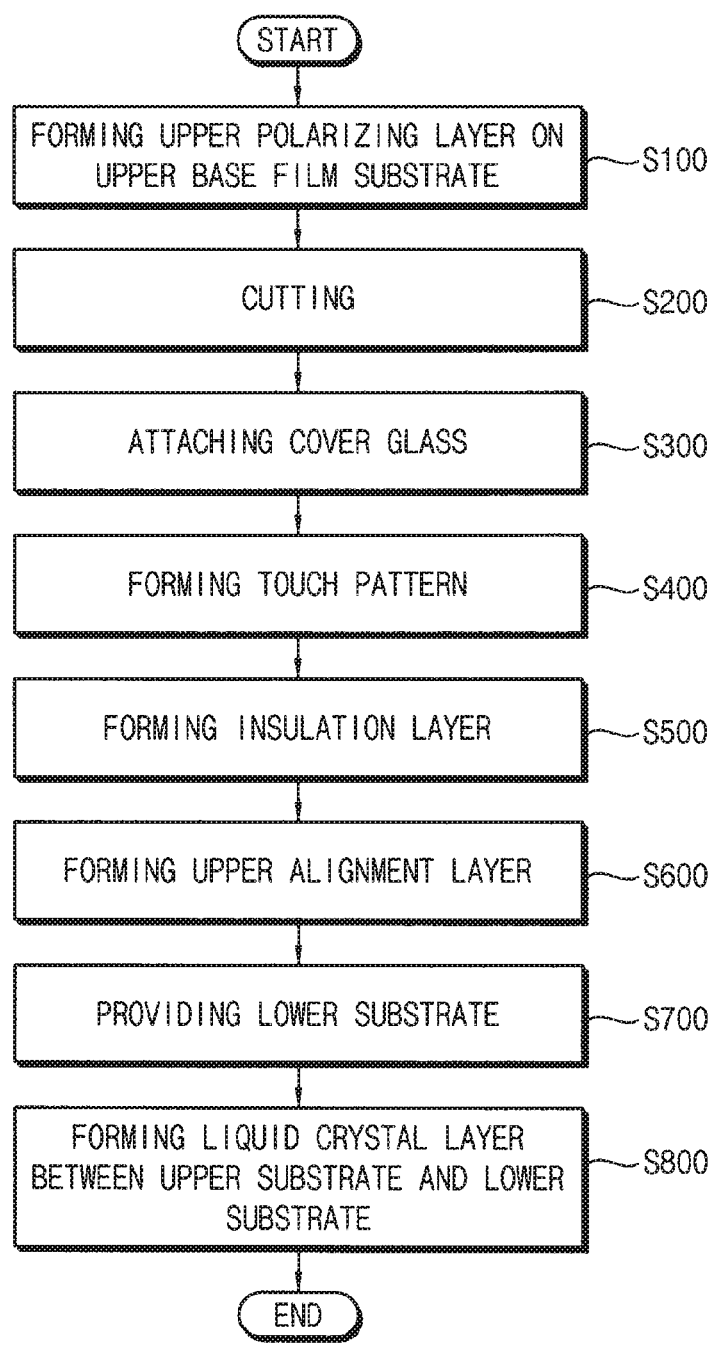
FIG. 1 is a flow chart illustrating a method of manufacturing a liquid crystal display panel according to an exemplary embodiment of the inventive concepts.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a flow chart illustrating a method of manufacturing a liquid crystal display panel according to an exemplary embodiment of the inventive concepts.

Referring to FIG. 1, the method of manufacturing the liquid crystal display panel may include forming an upper polarizing layer on an upper base film substrate (S100), cutting (S200), attaching a cover glass (S300), forming a touch pattern (S400), forming an insulation layer (S500), forming an upper alignment layer (S600), providing a lower substrate (S700) and forming a liquid crystal layer between the upper substrate and the lower substrate (S800).

In forming the upper polarizing layer (S100), the upper polarizing layer may be formed on the upper base film substrate. The upper base film substrate may have a thickness about 0.2 mm or less.

In cutting (S200), the upper base film substrate on which the upper polarizing layer is formed may be cut to the required size. The cover glass may be larger than the upper base film substrate which is cut, and have a light blocking part at an edge of the cover glass. The cover glass may have a thickness equal to or greater than 0.3 mm.

In attaching the cover glass (S300), the cover glass may be attached on the upper polarizing layer.

In forming the touch pattern (S400), the touch pattern may be formed on the upper base film substrate. The process of forming the touch pattern (S400) may be performed below 100 degrees Celsius.

In forming the insulation layer (S500), the insulation layer may be formed on the upper base film substrate on which the touch pattern is formed.

In forming the upper alignment layer (S600), the upper alignment layer may be formed on the insulation layer.

In providing the lower substrate (S700), the lower substrate including a lower base substrate, a thin film transistor, a first electrode electrically connected to the thin film transistor, a second electrode overlapping the first electrode, a color filter disposed overlapping the first electrode, and a lower alignment layer may be provided.

In forming the liquid crystal layer (S800), a liquid crystal layer may be formed between the lower substrate and an upper substrate which includes the cover glass, the upper base film substrate, the upper polarizing layer, the touch pattern, the insulation layer and the upper alignment layer.

FIGS. 2A to 2I are cross-sectional views illustrating a method of manufacturing a liquid crystal display panel according to an exemplary embodiment of the inventive concepts.

Figure 2A:
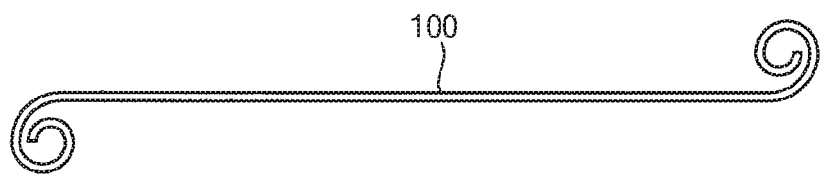

Referring to FIG. 2A, an upper base film substrate 100 may be provided. The upper base film substrate 100 may be a film-type substrate for an ultra-thin liquid crystal display apparatus with embedded touch sensor. For example, the upper base film substrate 100 may be provided by unrolling a thin glass roll. In addition, the upper base film substrate 100 may include a transparent insulation substrate. For example, the upper base film substrate 100 may include a glass substrate, a quartz substrate, a transparent resin substrate, etc. Examples of the transparent resin substrate for the upper base film substrate 100 may include polyimide-based resin, acryl-based resin, polyacrylate-based resin, polycarbonate-based resin, polyether-based resin, sulfonic acid containing resin, polyethyleneterephthalate-based resin, etc.

The upper base film substrate 100 may have a thickness less than or equal to about 0.2 mm. In addition, the thickness of the upper base film substrate 100 may be less than or equal to about 0.1 mm for an ultra-thin liquid crystal display panel.

Figure 2B:
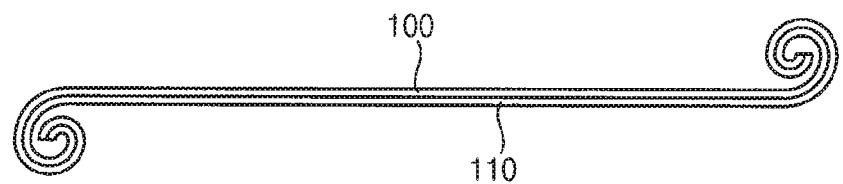

Referring to FIG. 2B, an upper polarizing layer 110 may be formed on the upper base film substrate 100. The upper polarizing layer 110 may be formed by attaching a polarizing plate on the upper base film substrate 100. For example, the upper base film substrate 100 and the upper polarizing layer 110 may be provided by a roll type which having the thin glass and the polarizing plate attached on the thin glass.

Figure 2C:
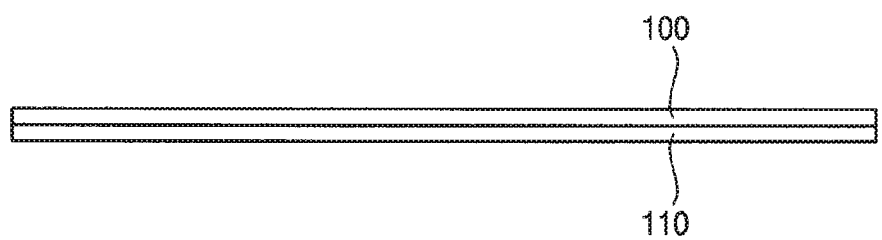

Referring to FIG. 2C, the upper base film substrate 100 on which the upper polarizing layer 110 is formed may be cut to the required size for the liquid crystal display panel. Referring to FIG. 2A to 2C, the upper base film substrate 100 and the upper polarizing layer 110 are provided using the thin glass roll. However, the inventive concepts are not limited thereto. For example, the upper base film substrate 100 on which the upper polarizing layer 110 is formed may be provided by attaching an upper polarizing layer 110 on an upper base film substrate 100 having a proper size without additional cutting process.

Figure 2D:
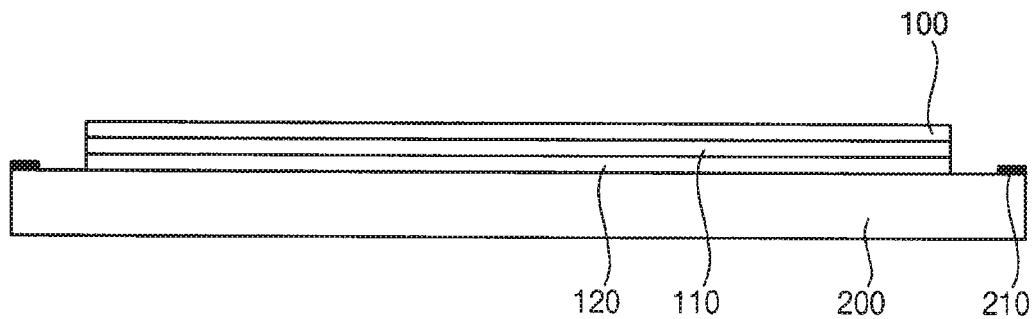

Referring to FIG. 2D, a cover glass 200 may be formed on the upper polarizing layer 110. Especially, an adhesive layer 120 may be formed on the upper polarizing layer 110, and then the cover glass 200 is attached on the adhesive layer 120. Thus, the upper base film substrate 100 with the cover glass 200 and the upper polarizing layer 110 may be provided. The area of the cover glass 200 may be greater than that of the upper base film substrate 100. A light blocking part 210 may be formed at an edge of the cover glass 200.

The adhesive layer 120 may include a adhesive or a pressure sensitive adhesive, so that the cover glass 200 may be attached on the upper polarizing layer 110 by the adhesive layer 120. Referring to FIG. 2D, the adhesive layer 120 may be formed on the upper polarizing layer 110, and then the cover glass 200, which has light blocking part 210, may be attached on the adhesive layer 120. However, the inventive concepts are not limited thereto. The above process can vary. For example, an adhesive layer 120 may be formed on the cover glass 200, and then the upper polarizing layer 110 may be attached on the adhesive layer 120.

The light blocking part 210 of the cover glass 200 may prevent light leakage of the liquid crystal display panel at an edge of the liquid crystal display panel. In addition, the cover glass 200 may protect the liquid crystal display panel from exposure to external shock. Thus, the cover glass 200 may be formed of a high-durability material. For example, the cover glass 200 may be a tempered glass, and have a thickness greater than or equal to about 0.3 mm to provide the required durability and protection. The cover glass 200 may have a thickness in a range of about 0.3 mm to 1.1 mm for the ultra-thin liquid crystal display panel.

Figure 2E:
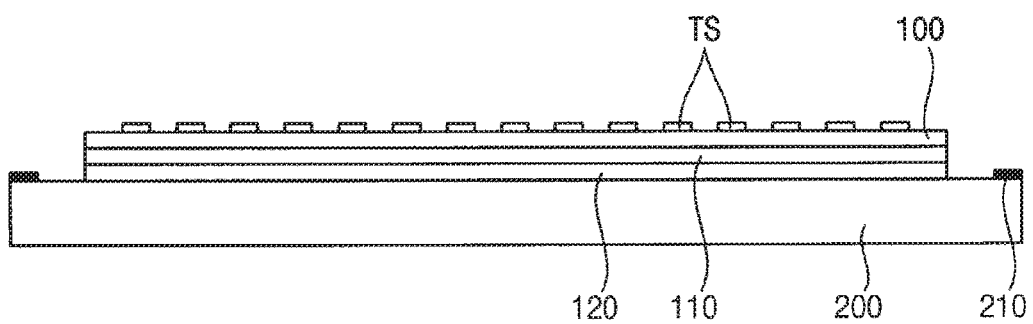

Referring to FIG. 2E, a touch pattern TS may be formed on a surface of the upper base film substrate 100 which is opposite to a surface on which the upper polarizing layer 110 is formed. The touch pattern TS may be an electrode pattern for sensing touch input. The touch pattern TS may include a transparent conductive material. For example, the touch pattern TS may include indium tin oxide (ITO), indium zinc oxide and/or fluorine-doped tin oxide (FTO).

In addition, the touch pattern TS may have a metal mesh structure. For example, the touch pattern TS may have a mesh structure formed by a fine line having a width less than about 5 um (micrometers). The fine line may include aluminum, copper, silver, molybdenum, platinum, palladium, neodymium, and/or alloy thereof.

The touch pattern TS is formed on the upper base film substrate 100 disposed on the upper polarizing layer 110, so that touch pattern TS is formed through a low temperature process in order not to damage the upper polarizing layer 110. For example, the touch pattern TS may be formed below about 100 degrees Celsius.

Although the touch pattern TS is formed as one layer in FIG. 2E, is the inventive concepts are not limited thereto. The touch pattern TS may have various structures. For example, the touch pattern TS may include a multi-layer structure having a first touch electrode, a second touch electrode, a bride electrode, and an intermediate insulation layer.

Here, the touch pattern TS is formed after the cover glass 200, having sufficient thickness and durability, is attached on the upper base film substrate 100, so that an additional carrier glass is unnecessary in processes such as deposition and patterning.

Thus, a film type substrate is usually used in order to form an ultra-thin touch-integrated liquid crystal display panel, so that an additional carrier glass was temporarily adhered under the film type substrate to perform a process such as deposition and patterning process for forming a touch pattern. However, according to the present exemplary embodiment, the touch pattern TS is formed after the cover glass 200 having enough thickness and durability is attached on the upper base film substrate 100, so that the upper base film substrate 100 can be firmly fixed and supported without the additional carrier glass during the deposition and patterning process. Thus, according to the present exemplary embodiment, there is no need to adhere and detach the additional carrier glass, so that a manufacturing process of the liquid crystal display apparatus may be simplified.

Figure 2F:
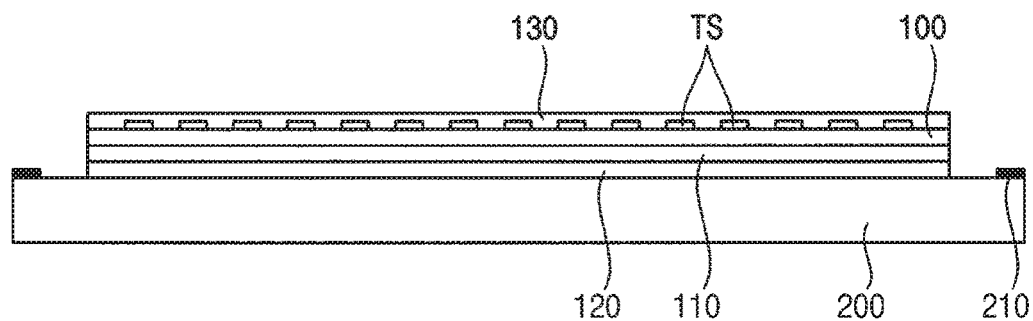

Referring to FIG. 2F, an insulation layer 130 may be formed on the upper base film substrate 100 on which the touch pattern TS is formed. The insulation layer 130 may include an organic insulation material or an inorganic insulation material. The insulation layer 130 may have single layer structure which includes organic insulation layer or inorganic insulation layer, or a multi-layer structure which includes organic insulation layer and/or inorganic insulation layer.

Figure 2G:
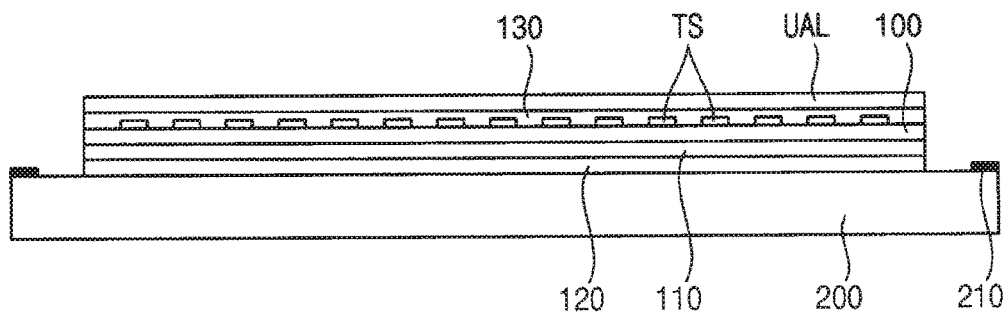

Referring to FIG. 2G, an upper alignment layer UAL may be formed on the insulation layer 130. The upper alignment layer UAL may be formed by coating an alignment agent on the insulation layer 130. For example, the alignment agent may include a polyimide-based compound, a polyamic acid-based compound, or a mixture thereof. In addition, the alignment agent may include a photo-alignment agent which aligns the liquid crystal by linearly polarized ultraviolet light.

Figure 2H:
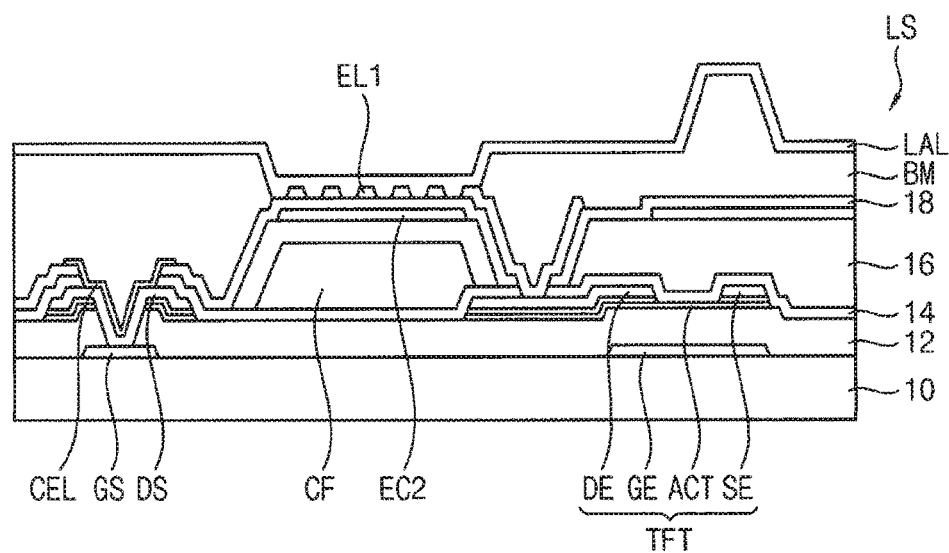
Figure 21:
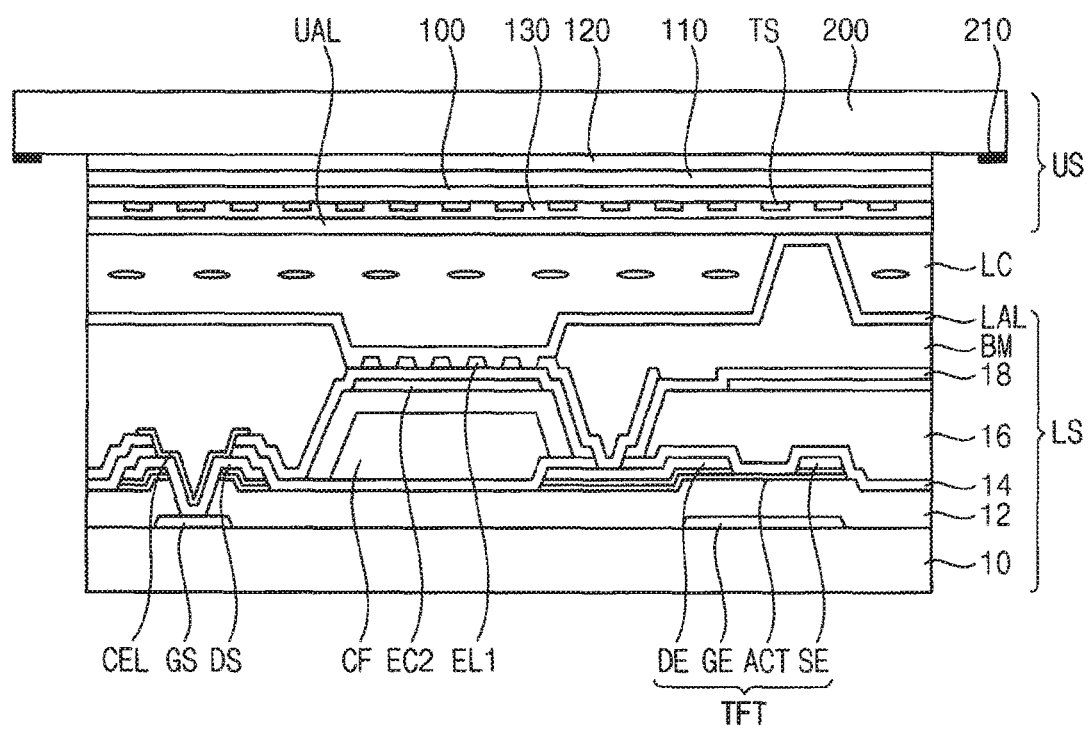

Referring to FIG. 2H, a lower substrate LS may be provided. The lower substrate LS may include a lower base substrate 10, a first insulation layer 12, a gate pattern, a second insulation layer 14, a data pattern, a thin film transistor TFT, a color filter CF, a third insulation layer 16, a second electrode 14, a fourth insulation layer 18, a first electrode EL1, a black matrix BM, and a lower alignment layer LAL. The thin film transistor may include an active pattern ACT, a gate electrode GE, a source electrode SE and a drain electrode DE. The gate pattern may include the gate electrode GE and a gate signal line GS. The data pattern may include the source electrode SE, the drain electrode DE and a data line DS. The lower substrate LS may further include a connecting electrode CEL, which is formed from the same layer as the first electrode EL1.

The lower base substrate 10 may include a glass substrate, a quartz substrate, a transparent resin substrate, etc. The lower base substrate 10 may have greater thickness and greater durability than the upper base film substrate 100. Thus, an additional carrier glass is not necessary to form the lower substrate LS. The lower base substrate 10 may have a thickness greater than or equal to about 0.4 mm (millimeters) for sufficient durability.

The gate electrode GE and the gate signal line GS may be disposed on the lower base substrate 10. The first insulation layer 12 may be disposed on the lower base substrate 10 on which the gate electrode GE and the gate signal line GS are formed. The active pattern ACT may be disposed on the first insulation layer 12. The data signal line DS, the source electrode SE, and the drain electrode DE may be disposed on the first insulation layer 12 on which the active pattern ACT is disposed. The second insulation layer 14 may be disposed on the first insulation layer 12 on which the active pattern ACT, the source electrode SE, and the drain electrode DE are disposed.

The color filter CF may be disposed on the second insulation layer 12. The color filter CF may supply colors to light passing through the liquid crystal layer LC. The color filter CF may be a red color filter, a green color filter, or blue color filter. The color filter CF may have different colors corresponding to pixels adjacent to each other.

The third insulation layer 16 may be disposed on the second insulation layer 14 on which the color filter CF is disposed. The second electrode EC2 may be disposed on the third insulation layer 16. The fourth insulation layer 18 may be disposed on the third insulation layer 16 on which the second electrode EC2 is disposed. The first electrode EL1 and the connecting electrode CEL may be disposed on the fourth insulation layer 18.

The second electrode EC2 may be a common electrode. A common voltage may be applied to the second electrode EC2. The first electrode EL1 may be a pixel electrode. The first electrode EL1 may be electrically connected to the drain electrode DE of the thin film transistor TFT through a contact hole formed through the fourth insulation layer 18, the third insulation layer 16, and the second insulation layer 14. A plurality of slits may be formed at the first electrode ELL The black matrix BM may be disposed on the fourth insulation layer 18 on which the first electrode EL1 is disposed. The black matrix BM may include a material which blocks light, and may overlap the thin film transistor TFT.

The lower alignment layer LAL may be disposed on the first electrode EL1 and the black matrix BM. The lower alignment layer LAL may include an alignment agent which aligns liquid crystal molecules of a liquid crystal layer LC. For example, the alignment agent may include a polyimide-based compound, a polyamic acid-based compound, or a mixture thereof. In addition, the alignment agent may include photo-alignment agent which align the liquid crystal by linearly polarized light ultraviolet.

The lower substrate LS may further include a column spacer (not shown) which maintain a gap between the lower substrate and an upper substrate.

The lower substrate LS may have various structures different from what is shown in the drawing. The lower substrate LS may be formed by traditional technology.

Referring to FIG. 2I, the liquid crystal layer LC may be formed between the lower substrate LS and an upper substrate US. The upper substrate US may include the cover glass 200, the adhesive layer 120, the upper polarizing layer 110, the upper base film substrate 100, the touch pattern TS, the insulation layer 130, and the upper alignment layer UAL.

The liquid crystal layer LC may be formed by injecting liquid crystal material between the upper substrate US and the lower substrate LS, or may be formed by dropping the liquid crystal material onto the upper substrate US and/or the lower substrate LS and bonding the upper substrate US to the lower substrate LS.

The liquid crystal layer LC may include liquid crystal molecules having optical anisotropy. The liquid crystal molecules may be driven by an electric field, so that an image may be displayed by passing or blocking light through the liquid crystal layer LC.

According to the method of manufacturing the liquid crystal display apparatus of an exemplary embodiment, a touch pattern is formed after a cover glass having enough thickness and durability is attached on an upper base film substrate, so that the upper base film substrate can be firmly fixed and supported without the additional carrier glass during the deposition and patterning process. Accordingly, there is no need to adhere and detach the additional carrier glass, so that manufacturing process of the liquid crystal display apparatus may be simplified.

In addition, a color filter, a black matrix and a column spacer are formed at the lower substrate, so that the upper substrate only has a structure for touch sensing, and a polarizer. Thus, manufacturing process of the upper substrate of the liquid crystal display apparatus may be simplified.

Figure 3:
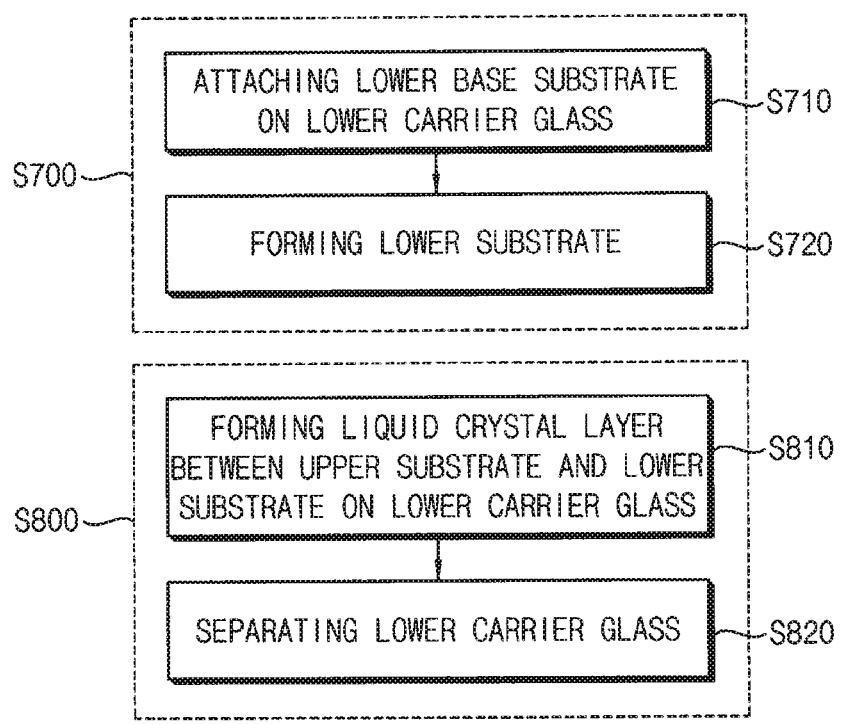
FIG. 3 is a flow chart illustrating providing a lower substrate and forming a liquid crystal layer between the lower substrate and an upper substrate of a method of manufacturing a liquid crystal display panel according to an exemplary embodiment of the inventive concepts.

FIG. 3 is a flow chart illustrating providing a lower substrate and forming a liquid crystal layer between the lower substrate and an upper substrate of a method of manufacturing a liquid crystal display panel according to an exemplary embodiment of the inventive concepts.

Referring to FIG. 3, providing the lower substrate (S700) may include attaching a lower base substrate on a lower carrier glass (S710) and forming a lower substrate (S720).

In attaching the lower base substrate on the lower carrier glass (S710), the lower carrier glass is attached on the lower base substrate. The lower base substrate may have a thickness less than or equal to about 0.2 mm.

In forming the lower substrate (S720), the thin film transistor, the first electrode, the second electrode, the color filter, and the lower alignment layer may be formed on the lower base substrate on the lower carrier glass.

Forming the liquid crystal layer S800 may include forming a liquid crystal layer between an upper substrate and the lower substrate on the lower carrier glass (S810) and separating the lower carrier glass (S820).

In forming the liquid crystal layer (S810), the liquid crystal layer may be formed between the upper substrate and the lower substrate attached on the lower carrier glass.

In separating the lower carrier glass (S820), the lower carrier glass may be separated from the lower base substrate.

Figure 4A:
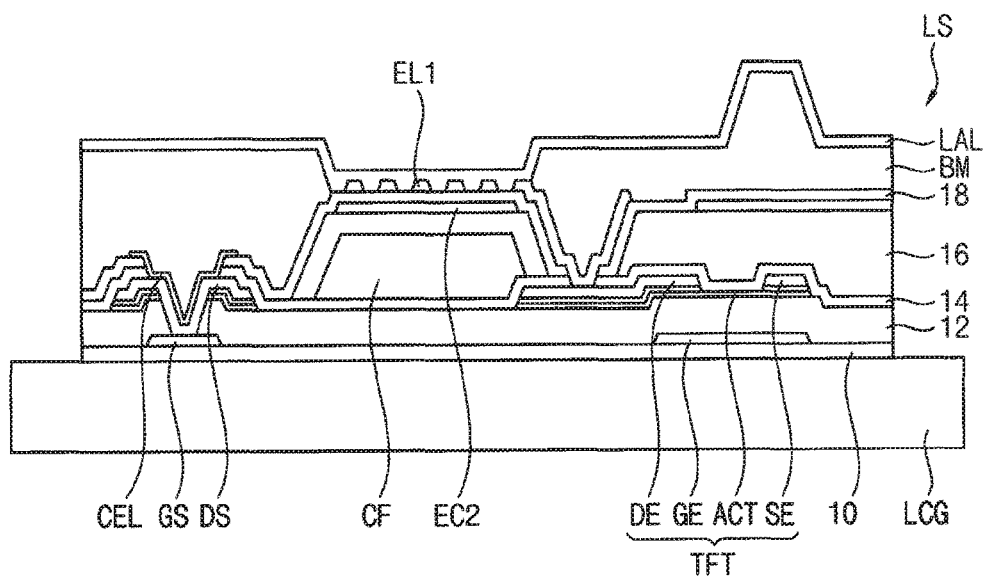
FIG. 4A, FIG. 4B, and FIG. 4C are cross-sectional views illustrating a method of manufacturing a liquid crystal display panel according to an exemplary embodiment of the inventive concepts.
Figure 4B:
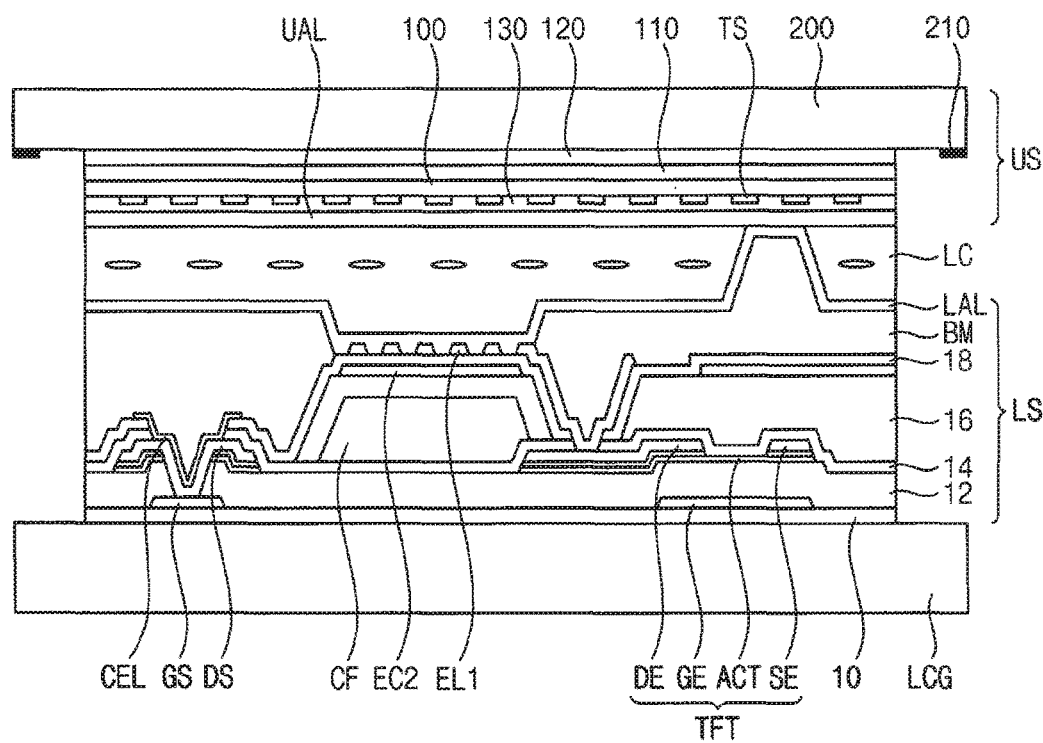
Figure 4C:
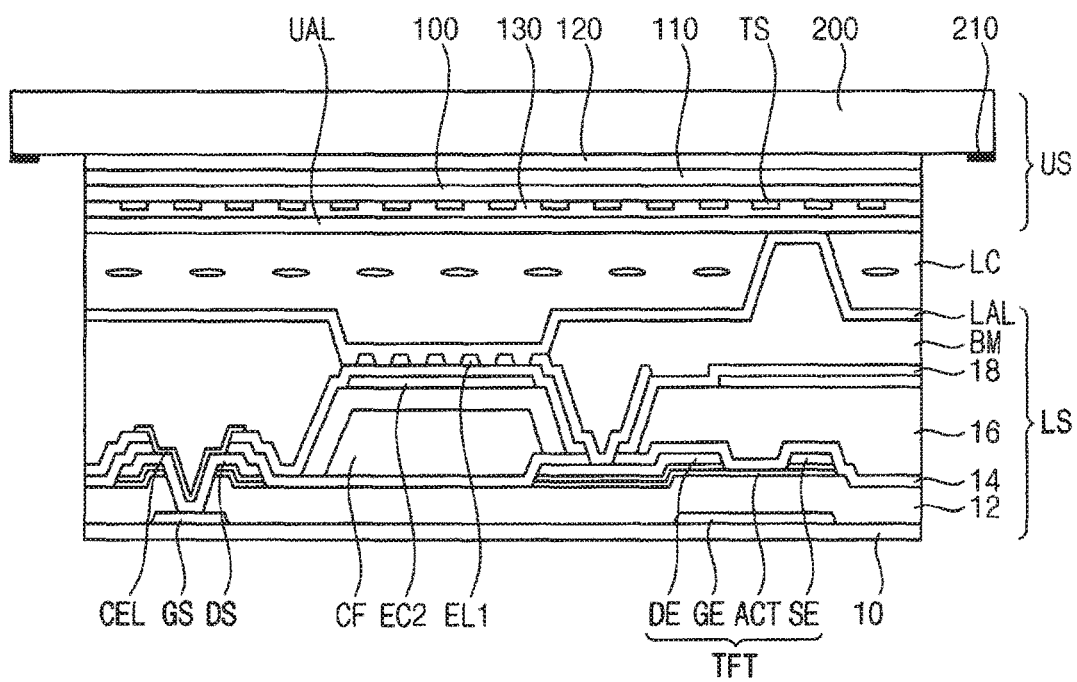

FIGS. 4A to 4C are cross-sectional views illustrating a method of manufacturing a liquid crystal display panel according to an exemplary embodiment of the inventive concepts.

Referring to FIG. 4A, a lower substrate LS including a lower base substrate 10 may be formed on a lower carrier glass LCG.

The lower base substrate 10 may be attached on the lower carrier glass LCG. The lower base substrate 10 may be a film type substrate for an ultra-thin liquid crystal display apparatus having an embedded touch sensor. For example, thin film glass may be used for the lower base substrate 10. The lower base substrate 10 may have a thickness less than or equal to about 0.2 mm. In addition, the lower base substrate 10 may have a thickness less than or equal to about 0.1 mm.

The lower carrier glass LCG may support the lower base substrate 10 during process for forming the lower substrate LS. The lower carrier glass LCG may be separated from the lower base substrate 10 before finalizing the liquid crystal display panel.

More particularly, the lower carrier glass LCG may be provided, and then surface treatment may be performed on a surface of the lower carrier glass LCG, so that a surface treatment layer (not shown) may be formed on the surface of the lower carrier glass LCG.

The lower carrier glass LCG may be formed of various materials. For example, the lower carrier glass LCG may be formed of a material similar to that of the lower base substrate 10, such as glass. The lower base substrate 10 which is a thin film may be easily handled during manufacturing process of the liquid crystal display panel because of the lower carrier glass LCG. Thus, the lower carrier glass LCG may prevent bending of the lower base substrate 10 and damage of the lower base substrate 10, so that the overall quality of the liquid crystal display panel may be improved.

The surface treatment layer which has hydrophobicity may be formed by various methods. For example, solution which contains HMDS (hexamethyldisilazane) may be coated on the surface of the lower carrier glass LCG to form the surface treatment layer having hydrophobicity.

The surface treatment layer having the hydrophobicity may be formed by various methods. For example, an inorganic material may be coated on the surface of the lower carrier glass LCG. Here, roughness of a surface of the inorganic material can be controlled. More particularly, the roughness of a surface of the inorganic material may be relatively small value not to exceed a predetermined value. If the roughness is too great, adhesion and separation of the lower carrier glass LCG and the lower base substrate 10 is not easily performed.

Then, the surface treatment layer of the lower carrier glass LCG and the lower base substrate 10 may make contact with each other, so that the lower carrier glass LCG and the lower base substrate 10 may be attached to each other.

When the lower base substrate 10 is attached on the lower carrier glass LCG, the lower carrier glass LCG and the lower base substrate 10 may not be fully joined. The lower carrier glass LCG and the lower base substrate 10 may be separated if a predetermined force is applied due to the surface treatment layer having hydrophobicity.

Then, a first insulation layer 12, a gate pattern, a second insulation layer 14, a data pattern, a thin film transistor TFT, a color filter CF, a third insulation layer 16, a second electrode 14, a fourth insulation layer 18, a first electrode EL1, a black matrix BM, and a lower alignment layer LAL may be formed on the lower base substrate 10 to provide a lower substrate LS. The thin film transistor may include an active pattern ACT, a gate electrode GE, a source electrode SE and a drain electrode DE. The gate pattern may include the gate electrode GE and a gate signal line GS. The data pattern may include the source electrode SE, the drain electrode DE and a data line DS. The lower substrate LS may further include a connecting electrode CEL, which is formed from a same layer as the first electrode EL1.

Referring to FIG. 4B, a liquid crystal layer LC may be formed between an upper substrate US and the lower substrate LS on the lower carrier glass LCG. The upper substrate US may include a cover glass 200, an adhesive layer 120, an upper polarizing layer 110, an upper base film substrate 100, a touch pattern TS, an insulation layer 130, and an upper alignment layer UAL. The upper substrate US may be formed using the method described in FIGS. 2A to 2G.

The liquid crystal layer LC may be formed by injecting liquid crystal material between the upper substrate US and the lower substrate LS, or by dropping the liquid crystal material onto the upper substrate US and/or the lower substrate LS and bonding the upper substrate US to the lower substrate LS.

Referring to FIG. 4C, the lower carrier glass LCG on the lower base substrate 10 may be separated from the lower base substrate 10.

More particularly, the lower carrier glass LCG may be separated from the lower base substrate 10. As mentioned above, when the surface treatment layer is formed on the lower carrier glass LCG, the surface treatment layer has the hydrophobicity. The lower base substrate 10, which contacts the surface treatment layer, can be separated from the lower carrier glass LCG with a relatively small force, so that separation is relatively easy. Thus, the surface of the lower base substrate 10, which has hydrophilicity, and the surface treatment layer having hydrophobicity can be easily separated from each other without an additional high temperature process or chemical additives.

Figure 5:
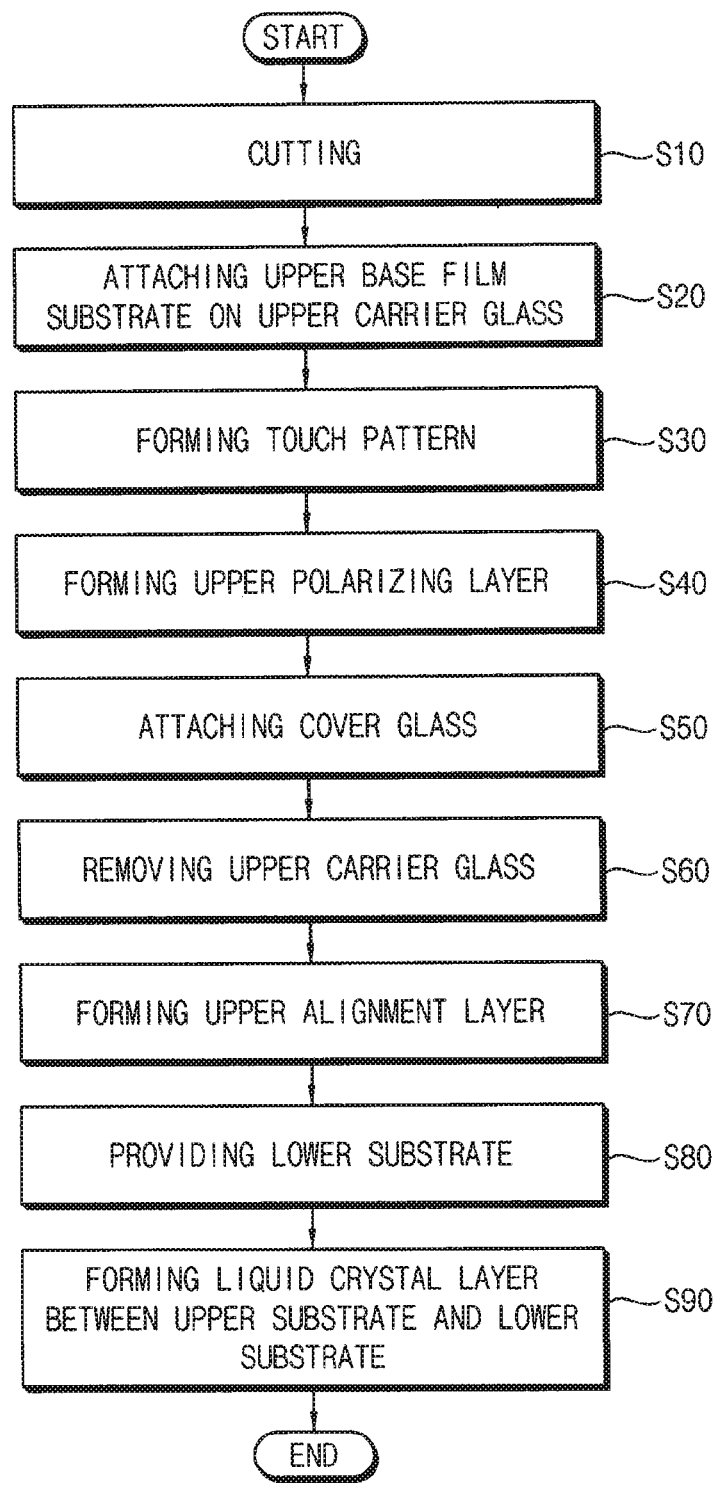
FIG. 5 is a flow chart illustrating a method of manufacturing a liquid crystal display panel according to an exemplary embodiment of the inventive concepts.

FIG. 5 is a flow chart illustrating a method of manufacturing a liquid crystal display panel according to an exemplary embodiment of the inventive concepts.

Referring to FIG. 5, the method of manufacturing the liquid crystal display panel may include cutting (S10), attaching an upper base film substrate on an upper carrier glass (S20), forming a touch pattern (S30), forming an upper polarizing layer (S40), attaching a cover glass (S50), removing the upper carrier glass (S60), forming an upper alignment layer (S70), providing a lower substrate (S80), and forming a liquid crystal layer between the upper substrate and the lower substrate (S90).

In cutting (S10), the upper base film substrate may be cut to the required size. The upper base film substrate may have a thickness less than or equal to about 0.2 mm.

In attaching the upper base film substrate on the upper carrier glass (S20), the upper base film substrate may be attached on the upper carrier glass.

In forming the touch pattern (S30), the touch pattern may be formed on the upper base film substrate.

In forming the upper polarizing layer (S40), the upper polarizing layer may be formed on the touch pattern.

In attaching the cover glass (S50), the cover glass may be attached on the upper polarizing layer. The area of the cover glass may be greater than that of the upper base film substrate which is cut, and a light blocking part may be disposed at an edge of the cover glass. The cover glass may have a thickness greater than or equal to 0.3 mm.

In removing the upper carrier glass (S60), the upper carrier glass may be separated from the upper base film substrate.

In forming the upper alignment layer (S70), the upper alignment layer may be formed on the upper base film substrate.

In providing the lower substrate (S80), the lower substrate including a lower base substrate, a thin film transistor, a first electrode electrically connected to the thin film transistor, a second electrode overlapping the first electrode, a color filter disposed overlapping the first electrode, and a lower alignment layer may be provided.

In forming the liquid crystal layer between the upper substrate and the lower substrate (S90), the liquid crystal layer may be formed between the lower substrate and an upper substrate which includes the cover glass, the upper base film substrate, the upper polarizing layer, the touch pattern, the insulation layer and the upper alignment layer.

FIGS. 6A to 6I are cross-sectional views illustrating a method of manufacturing a liquid crystal display panel according to an exemplary embodiment of the inventive concepts.

Figure 6A:
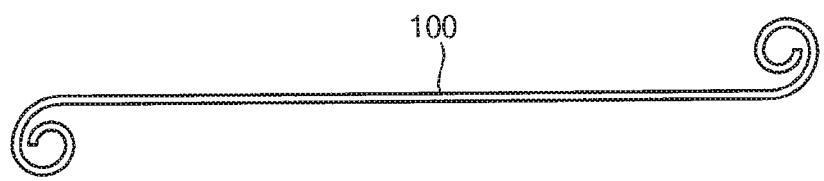
FIG. 6A, FIG. 6B, FIG. 6C, FIG. 6D, FIG. 6E, FIG. 6F, FIG. 6G, and FIG. 6H are cross-sectional views illustrating a method of manufacturing a liquid crystal display panel according to an exemplary embodiment of the inventive concepts

Referring to FIG. 6A, an upper base film substrate 100 may be provided. The upper base film substrate 100 may be a film type substrate for an ultra-thin liquid crystal display apparatus with an embedded touch sensor. For example, the upper base film substrate 100 may be provided by unrolling a thin glass roll. Thus, the thin glass may be used for the upper base film substrate 100.

The upper base film substrate 100 may have a thickness less than or equal to about 0.2 mm. In addition, the thickness of the upper base film substrate 100 may be less than or equal to about 0.1 mm for an ultra-thin liquid crystal display panel.

Figure 6B:
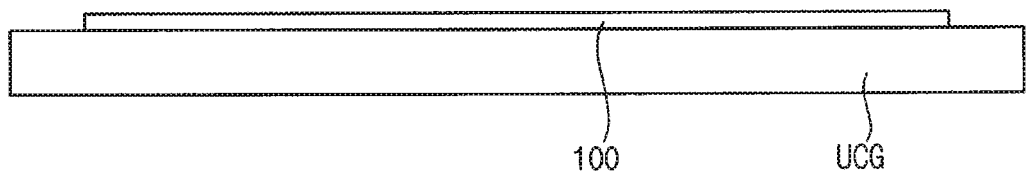

Referring to FIG. 6B, the upper base film substrate 100 may be cut into a proper size for manufacturing the liquid crystal display. Then, the upper base film substrate 100 may be attached on an upper carrier glass UCG.

The upper carrier glass UCG may support the upper base film substrate 100 during a process for forming the upper substrate. The upper carrier glass UCG may be separated from the upper base film substrate 100 before finalizing the liquid crystal display panel.

More particularly, the upper carrier glass UCG may be provided, and then surface treatment may be performed on a surface of the upper carrier glass UCG, so that a surface treatment layer (not shown) may be formed on the surface of the upper carrier glass UCG.

The upper carrier glass UCG may be formed from various materials. For example, the upper carrier glass UCG may be formed of a material similar to that of the upper base film substrate 100, such as glass. The upper base film substrate 100, which is a thin film, may be easily handled during manufacturing process of the liquid crystal display panel because of the upper carrier glass UCG. Thus, the upper carrier glass UCG may prevent bending of the upper base film substrate 100 with the resulting damage of the upper base film substrate 100, so that the overall quality of the liquid crystal display panel may be improved.

The surface treatment layer, which has hydrophobicity, may be formed by various methods. For example, solution which contains HMDS (hexamethyldisilazane) may be coated on the surface of the upper carrier glass UCG to form the surface treatment layer having hydrophobicity.

The surface treatment layer having hydrophobicity may be formed using various methods. For example, an inorganic material may be coated on the surface of the upper carrier glass UCG. Here, roughness of a surface of the inorganic material can be controlled. More particularly, the roughness of a surface of the inorganic material may be a relatively small value not to exceed a predetermined value. If the roughness is too great, adhesion and separation of the upper carrier glass UCG and the upper base film substrate 100 is not easy.

Then, the surface treatment layer of the upper carrier glass UCG and the upper base film substrate 100 may make contact with each other, so that the upper carrier glass UCG and the upper base film substrate 100 may be attached to each other.

When the upper base film substrate 100 is attached on the upper carrier glass UCG, the upper carrier glass UCG and the upper base film substrate 100 may not be fully joined. The upper carrier glass UCG and the upper base film substrate 100 may be separated if a predetermined force is applied due to the surface treatment layer having hydrophobicity.

Figure 6C:
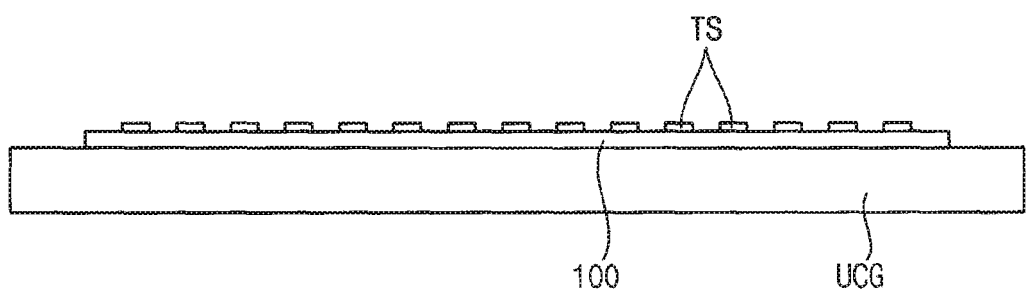

Referring to FIG. 6C, a touch pattern TS may be formed on the upper base film substrate 100. The touch pattern TS may be an electrode pattern for sensing touch input. The touch pattern TS may be a transparent conductive material. For example, the touch pattern TS may include indium tin oxide ITO, indium zinc oxide IZO and/or fluorine-doped tin oxide FTO.

In addition, the touch pattern TS may have a metal mesh structure. For example, the touch pattern TS may have a mesh structure formed by a fine line having a width less than about 5 um (micrometer). The fine line may include aluminum, copper, silver, molybdenum, platinum, palladium, neodymium, and/or alloy thereof.

The touch pattern TS is formed before attaching a polarizing layer. Thus, the touch pattern TS may be formed by a high temperature process. For example, the touch pattern TS may be formed over about 150 Celsius degree.

Figure 6D:
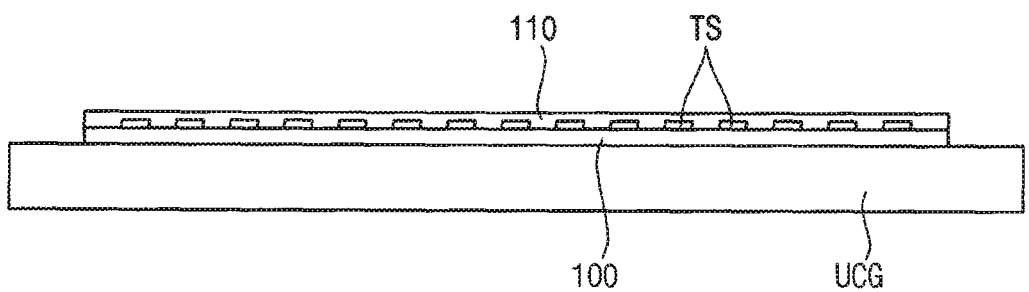

Referring to FIG. 6D, an upper polarizing layer 110 may be formed on the upper base film substrate 100 on which the touch pattern TS is formed. The upper polarizing layer 110 may be formed by attaching a polarizing plate on the upper base film substrate 100 on which the touch pattern TS is formed.

Figure 6E:
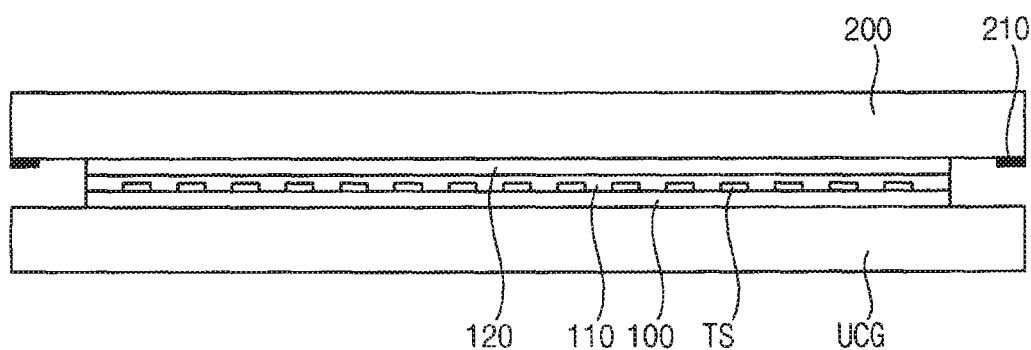

Referring to FIG. 6E, a cover glass 200 may be formed on the upper polarizing layer 110. More particularly, an adhesive layer 120 may be formed on the upper polarizing layer 110, and then the cover glass 200 may be attached on the adhesive layer 120, so that the upper base film substrate 100 on which the cover glass 200 and the upper polarizing layer 110 are formed may be provided. The area of the cover glass 200 may be greater than that of the upper base film substrate 100, and may have a light blocking part 210. The light blocking part 210 may be formed at an edge of the cover glass 200.

The adhesive layer 120 may include adhesive or pressure sensitive adhesive, so that the cover glass 200 may be attached on the upper polarizing layer 110 by the adhesive layer 120.

The light blocking part 210 of the cover glass 200 may prevent light leakage of the liquid crystal display panel at an edge of the liquid crystal display panel. In addition, the cover glass 200 may protect the liquid crystal display panel from exposure to external shock.

Thus, the cover glass 200 may be formed of a high-durability material. For example, the cover glass 200 may be a tempered glass, and have a thickness greater than or equal to about 0.3 mm for adequate durability. The cover glass 200 may have a thickness in a range of about 0.3 mm to 1.1 mm for the ultra-thin liquid crystal display panel.

Figure 6F:
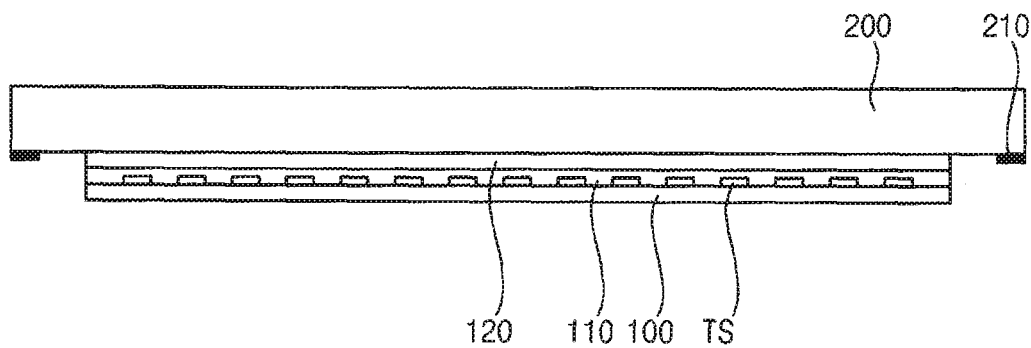

Referring to FIG. 6F, the upper carrier glass UCG may be separated from the upper base film substrate 100.

More particularly, the upper carrier glass UCG may be separated from the upper base film substrate 100. As mentioned above, when the surface treatment layer is formed on the upper carrier glass UCG, the surface treatment layer has hydrophobicity. The upper base film substrate 100, which makes contact to the surface treatment layer, can be separated from the upper carrier glass UCG with relatively small force, so that separation is easy. Thus, the surface of the upper base film substrate 100, which has hydrophilicity, and the surface treatment layer having the hydrophobicity can be easily separated from each other without additional high temperature process or chemical additives.

Figure 6G:
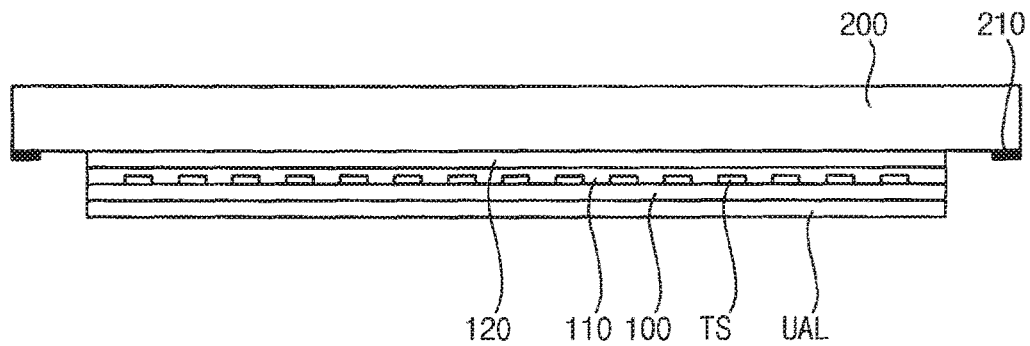

Referring to FIG. 6G, an upper alignment layer UAL may be formed on a surface of the upper base film substrate 100 which is opposite to the touch pattern TS. The upper alignment layer UAL may be formed by coating an alignment agent on the upper base film substrate 100. For example, the alignment agent may include a polyimide-based compound, a polyamic acid-based compound, or a mixture thereof. In addition, the alignment agent may include photo-alignment agent which align the liquid crystal by linearly polarized light ultraviolet.

Figure 6H:
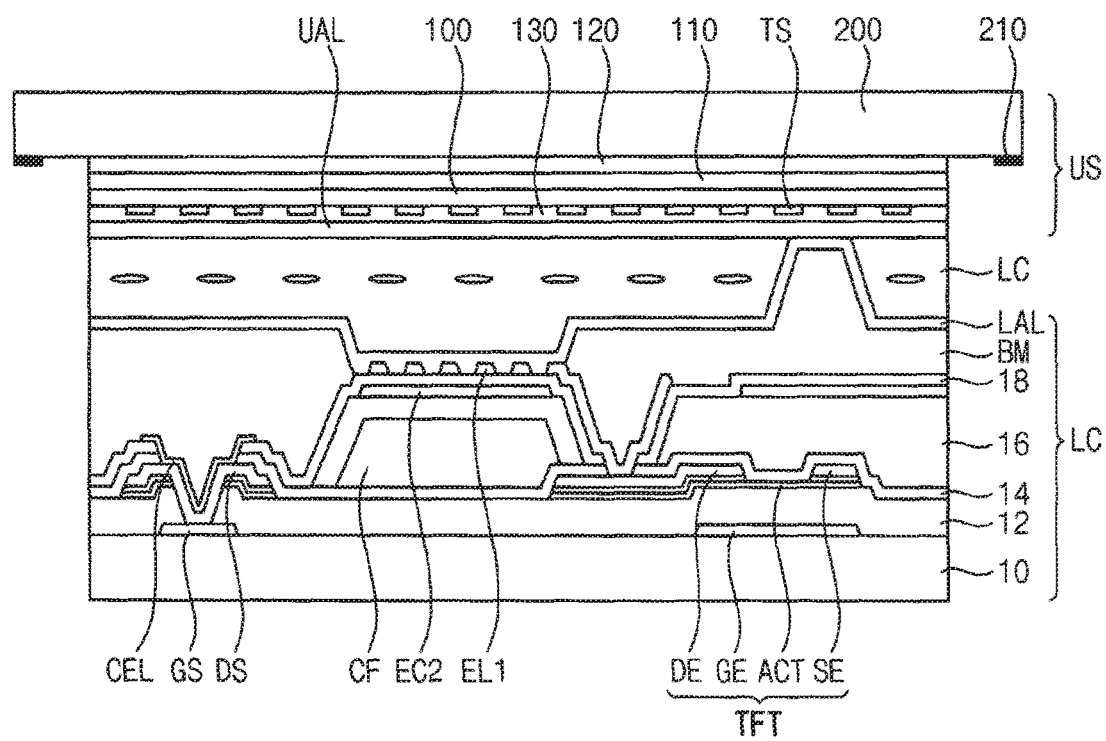

Referring to FIG. 6H, a lower substrate LS may be provided. The lower substrate LS may include a lower base substrate 10, a first insulation layer 12, a gate pattern, a second insulation layer 14, a data pattern, a thin film transistor TFT, a color filter CF, a third insulation layer 16, a second electrode 14, a fourth insulation layer 18, a first electrode EL1, a black matrix BM, and a lower alignment layer LAL. The thin film transistor may include an active pattern ACT, a gate electrode GE, a source electrode SE and a drain electrode DE. The gate pattern may include the gate electrode GE and a gate signal line GS. The data pattern may include the source electrode SE, the drain electrode DE and a data line DS. The lower substrate LS may further include a connecting electrode CEL which is formed from a same layer as the first electrode EL1.

The lower base substrate 10 may include a glass substrate, a quartz substrate, a transparent resin substrate, etc. The lower base substrate 10 may have greater thickness and durability than the upper base film substrate 100. Thus, an additional carrier glass is not necessary to form the lower substrate LS. The lower base substrate 10 may have a thickness greater than or equal to about 0.4 mm (millimeters) for sufficient durability.

Figure 7:
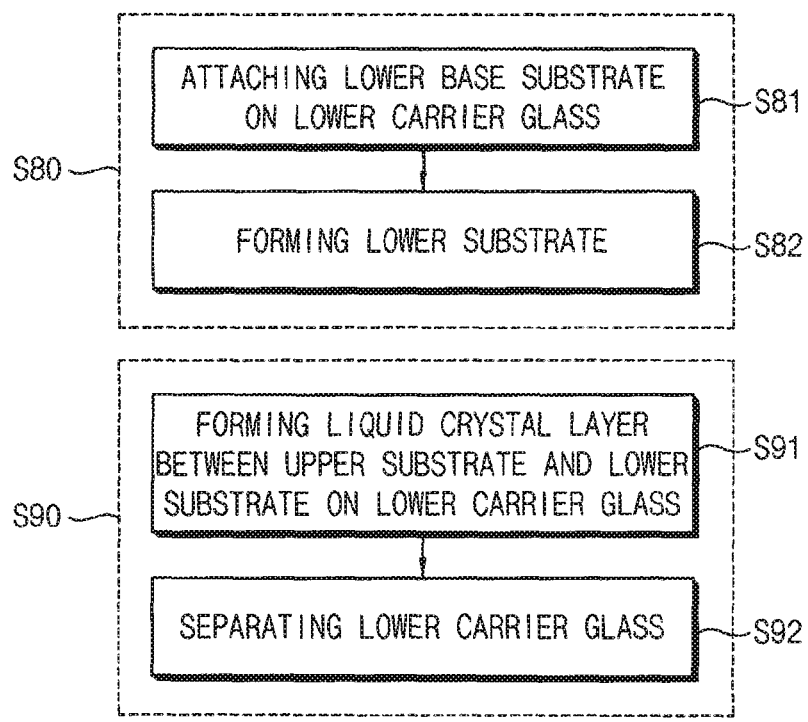
FIG. 7 is a flow chart illustrating providing a lower substrate and forming a liquid crystal layer between the lower substrate and an upper substrate of a method of manufacturing a liquid crystal display panel according to an exemplary embodiment of the inventive concepts.

FIG. 7 is a flow chart illustrating providing a lower substrate and forming a liquid crystal layer between the lower substrate and an upper substrate of a method of manufacturing a liquid crystal display panel according to an exemplary embodiment of the inventive concepts.

Referring to FIG. 7, providing the lower substrate (S80) of the method of manufacturing the liquid crystal display panel may include attaching a lower base substrate on a lower carrier glass (S81) and forming a lower substrate (S82).

In attaching the lower base substrate on the lower carrier glass (S81), the lower carrier glass may be attached on the lower base substrate. The lower base substrate may have a thickness less than or equal to about 0.2 mm.

In forming the lower substrate (S82), the thin film transistor, the first electrode, the second electrode, the color filter and the lower alignment layer may be formed on the lower base substrate on the lower carrier glass.

In forming the liquid crystal layer (S90) of the method of manufacturing the liquid crystal display panel may include forming the liquid crystal layer between the upper is substrate and the lower substrate on the lower carrier glass (S91) and separating the lower carrier glass (S92).

In forming the liquid crystal layer (S91), the liquid crystal layer may be formed between the upper substrate and the lower substrate on the lower carrier glass.

In separating the lower carrier glass (S92), the lower carrier glass may be separated from the lower base substrate.

According to the present inventive concepts, a touch pattern is formed after a cover glass having sufficient thickness and durability is attached on an upper base film substrate, so that the upper base film substrate can be firmly fixed and supported without the additional carrier glass during the deposition and patterning process. Thus, according to the present exemplary embodiment, there is no need to adhere and detach the additional carrier glass, so that a manufacturing process of the liquid crystal display apparatus may be simplified.

In addition, a color filter, a black matrix and a column spacer are formed at a lower substrate, so that an upper substrate only has a structure for touch sensing, and a polarizer. Thus, a manufacturing process of the upper substrate of the liquid crystal display apparatus may be simplified.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A method of manufacturing a liquid crystal display panel, the method comprising:
    forming an upper polarizing layer on a first surface of an upper base film substrate;
    cutting the upper base film substrate on which the upper polarizing layer is formed;
    attaching a cover glass on the upper polarizing layer;
    forming a touch pattern directly on a second surface of the upper base film substrate, which is opposite to the first surface of the upper base film substrate, after attaching the cover glass on the upper polarizing layer;
    forming an insulation layer on the upper base film substrate on which the touch pattern is formed;
    forming an upper alignment layer on the insulation layer;
    providing a lower substrate comprising a thin film transistor, a first electrode electrically connected to the thin film transistor, a second electrode overlapping the first electrode, a color filter overlapping the first electrode, and a lower alignment layer; and
    forming a liquid crystal layer between the lower substrate and an upper substrate which comprises the cover glass, the upper base film substrate, the upper polarizing layer, the touch pattern and the insulation layer.

2. The method of claim 1, wherein a thickness of the upper base film substrate is less than or equal to 0.2 mm (millimeters).

3. The method of claim 2, wherein:
    an area of the cover glass is greater than that of the upper base film substrate; and
    a light blocking part is formed at an edge of the cover glass.

4. The method of claim 3, wherein thickness of the cover glass is greater than or equal to 0.3 mm.

5. The method of claim 1, wherein:
    the lower substrate further comprises a lower base substrate on which the thin film transistor, the first electrode, the second electrode, the color filter and the lower alignment layer are formed; and
    a thickness of the lower base substrate is greater than or equal to 0.4 mm.

6. The method of claim 2, wherein a thickness of the lower base substrate is less than or equal to 0.2 mm.

7. The method of claim 6, wherein providing the lower substrate comprises:
    attaching a lower carrier glass on the lower base substrate; and forming the thin film transistor, the first electrode, the second electrode, the color filter and the lower alignment layer on the lower base substrate.

8. The method of claim 7, wherein forming the liquid crystal layer comprises:

forming the liquid crystal layer between the upper substrate and the lower substrate on the lower carrier glass; and separating the lower carrier glass from the lower base substrate.

9. The method of claim 7, wherein thickness of the lower carrier glass is greater than or equal to 0.4 mm.

10. The method of claim 1, wherein forming the touch pattern is performed below 100 degrees Celsius.

11. The method of claim 1, wherein a light blocking part is formed directly on an edge portion of the cover glass which extends beyond a side edge of the upper base film substrate.

* * * * *